UNITED STATES PATENT OFFICE.

ANSIL MOFFATT, OF INDIANAPOLIS, INDIANA.

MANUFACTURE OF STARCH.

SPECIFICATION forming part of Letters Patent No. 545,128, dated August 27, 1895.

Application filed April 15, 1895. Serial No. 545,797. (No specimens.)

*To all whom it may concern:*

Be it known that I, ANSIL MOFFATT, a citizen of the United States, residing at Indianapolis, in the county of Marion and State of Indiana, have invented certain new and useful Improvements in the Process of Treating Wet Starch by Centrifugal Action, &c.; and I do hereby declare the following to be a full, clear, and exact description of the invention, such as will enable others skilled in the art to which it appertains to make and use the same.

This invention relates to that stage of starch manufacture where starch, having been purified by the usual methods, is taken from the runs or tables on which it has settled from the crude liquors and is subjected to the preliminary operations of molding in cellar boxes, then draining and placing in hot kilns to draw the colored impurities to the surface, which operation is technically known as "crusting," and which results in partially drying the starch, and finally scraping the colored "crust" away and drying the "scraped" starch after usual methods for "pearl" or for "lump" starch.

The object of my invention is to do away with the above-mentioned operations of boxing, crusting, and scraping, and I accomplish this object in the following manner: I take the starch from the "runs," which is practically pure, but contains about fifty per centum of water, (absolutely dry standard,) and either stir it up with water into a thick milk containing about forty per centum of anhydrous starch, or else I break it up into small pieces by proper machinery. Then in either case I put it into a centrifugal machine, (such as is used for throwing sirup out of sugar in sugar-works,) the basket of which I line with canvas, muslin, or ducking or other suitable cloth. I then operate the machine so as to throw out the water from the starch-milk or magma, as the case may be, until the starch remaining in the machine contains about thirty-six per centum of water to absolutely dry standard. When the starch has been drained, as thus described, in the centrifugal machine, I remove it therefrom and break it up by a mixing and sifting machine to a uniform pulverulent or granular condition, then heat the mass to from 110° to 160° Fahrenheit, according to the kind of starch I design to make, preferably a temperature of 140° will be adopted, and while still hot I subject it to pressure in a suitable press, producing cakes of any desired size. For pearl-starch I make these cakes cubical, and measuring from five to six inches on each side in order to make cubes weighing from five to six pounds when dry, this being the size preferred in commerce, and after removal from the press I wrap the cubes in paper and set them in dry-rooms heated to from 140° to 180° Fahrenheit to dry in the usual manner.

For lump-starch I press the starch into cakes of any convenient size and put the cakes into dry-rooms heated to 110° to 130° Fahrenheit, placing the cakes in trays, so as to allow them to split into irregular lumps or dry in their given shape slowly, as heretofore.

I am aware that starch has been drained by centrifugal action before this, and do not claim, broadly, that process; but I am not aware that starch has ever been removed from centrifugal machines and rendered homogeneous by mixing and sifting and afterward pressed into cakes.

Starch dried by centrifugal action invariably arranges itself in annular layers which vary so much in color as to give a decidedly streaky appearance to the mass, rendering the starch unsalable. Hence the necessity of mixing and sifting to render it homogeneous. Then, again, starch dried to proper conditions by centrifugal action becomes very brittle, begins to disintegrate, falls apart, and will not retain the shape required for lump and block starch, besides which the mass of starch dried in this manner is not of requisite specific gravity, being lighter in weight than an equal bulk of starch made by the old process, and therefore requires different-sized boxes from that usually required and to which the trade is accustomed; but by using the centrifugal machine to extract a certain excess of moisture and then completing the process in the manner hereinbefore explained I am able to produce lump and block starch which is merchantable and similar to starch previously offered on the market, but at a greatly-reduced cost; and, therefore,

I claim—

The herein described process of treating wet starch, which consists, first, in removing the moisture by centrifugal action to within twenty-five per centum or thirty-six per centum of absolute dryness, then rendering pulverulent and homogeneous by mixing and sifting, then heating to from 110° to 160° Fahrenheit and subjecting to pressure at this temperature whereby the starch will be formed into coherent masses and finally drying out the starch to the proper state to enter commerce.

In testimony whereof I affix my signature in presence of two witnesses.

ANSIL MOFFATT.

Witnesses:
JOSEPH A. MINTURN,
G. L. SULLIVAN.